(12) United States Patent
Frignac et al.

(10) Patent No.: US 6,738,580 B2
(45) Date of Patent: May 18, 2004

(54) WAVELENGTH DIVISION MULTIPLEX TRANSMISSION SYSTEM USING ASYMMETRICAL FILTERING

(75) Inventors: Yann Frignac, Paris (FR); Sébastien Bigo, Palaiseau (FR)

(73) Assignee: Alcatel, Paris (FR)

( * ) Notice: Subject to any disclaimer, the term of this patent is extended or adjusted under 35 U.S.C. 154(b) by 445 days.

(21) Appl. No.: 09/793,510

(22) Filed: Feb. 27, 2001

(65) Prior Publication Data

US 2001/0019438 A1 Sep. 6, 2001

(30) Foreign Application Priority Data

Mar. 3, 2000 (FR) .............................................. 00 02754

(51) Int. Cl.[7] .............................................. H04J 14/02
(52) U.S. Cl. ......................................... 398/79; 398/158
(58) Field of Search ........................... 398/79, 192, 158, 398/82, 212, 213

(56) References Cited

U.S. PATENT DOCUMENTS 5,546,210 A * 8/1996 Chraplyvy et al. ........... 398/79
5,790,301 A * 8/1998 Maeda et al. ................ 359/337
6,175,436 B1 * 1/2001 Jackel ......................... 359/349
6,282,341 B1 * 8/2001 Digonnet et al. ............. 385/37
6,366,376 B1 * 4/2002 Miyata et al. ................ 398/79
6,556,742 B2 * 4/2003 Shirasaki ..................... 385/24

FOREIGN PATENT DOCUMENTS

WO    WO 99/49599    9/1999

OTHER PUBLICATIONS

Sardesai, H. P.: "Simple Channel Plan to Reduce Effects on Non–Linearitites in Dense WDM Systems", Baltimore, MD, May 23–28, 1999, New York, NY: IEEE, US, pp. 183–184, XP000901211 ISBN: 7–7803–5658–6.

* cited by examiner

Primary Examiner—Leslie Pascal
Assistant Examiner—Christina Y Leung
(74) Attorney, Agent, or Firm—Sughrue Mion, PLLC

(57) ABSTRACT

The invention relates to a wavelength division multiplex transmission system; for one channel, the spectral interval between adjacent channels on one side is different from the spectral interval between adjacent channels on the other side. A demultiplexing filter is used which attenuates more strongly the spectrum of the channel on the side on which the spectral interval between adjacent channels is smaller. The invention improves spectral efficiency and retains frequencies chosen from a grid of regularly spaced frequencies.

7 Claims, 3 Drawing Sheets

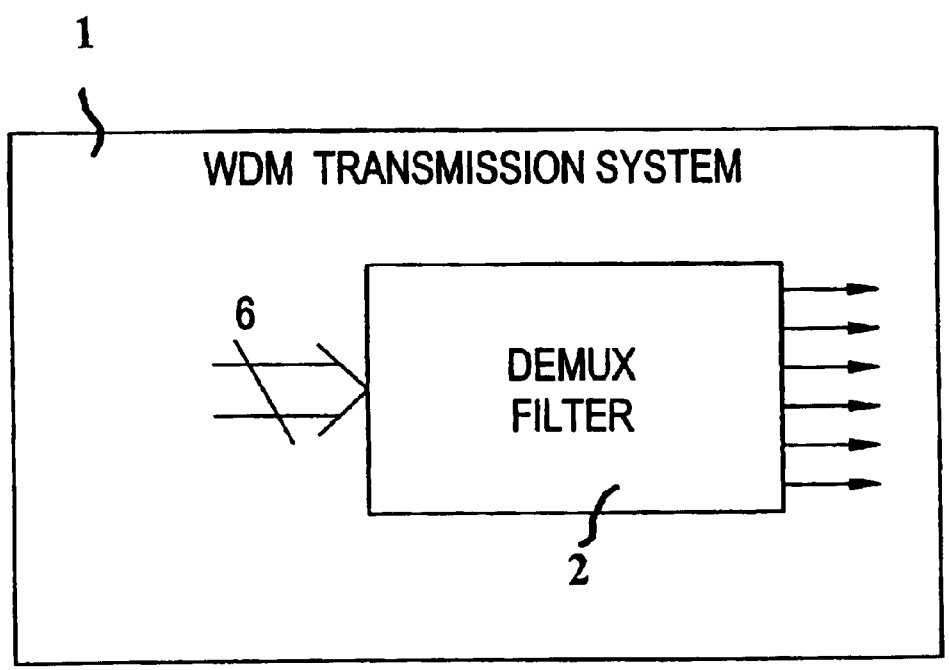

WAVELENGTH DIVISION MULTIPLEX TRANSMISSION SYSTEM USING ASYMMETRICAL FILTERING

The present invention relates to fiber optic transmission systems and more precisely to high bit rate wavelength division multiplex fiber optic transmission systems. In the present context the expression "high bit rate" means a bit rate per channel greater than or equal to 10 Gbit/s.

BACKGROUND OF THE INVENTION

ITU-T Recommendation G.692, "Optical interfaces for multichannel systems with optical amplifiers", 10/98, appendix II proposes a regular frequency step of 50 GHz. It would be beneficial to be able to conform to this recommendation for high bit rate transmission systems as well; however, a problem that arises in this case is that of coherent crosstalk between adjacent channels. Appendix V of the recommendation proposes spectral intervals that are varied in a pseudo-random manner to reduce four-wave mixing. There is an explicit suggestion to choose unequal spectral intervals for the channel frequencies so that no new optical power generated by four-wave mixing lies in any optical signal channel (see Section V.1.1).

Y. Yano et al., "2.6 Terabit/s WDM transmission experiment using optical duobinary coding", ECOC'96, ThB3.1, pages 5.3 to 5.6, is representative of the best results that can currently be obtained in transmission systems and proposes using duobinary coding for transmission on channels separated by 33.3 GHz. The paper refers to duobinary coding as a technique for reducing bandwidth to achieve good spectral efficiency.

OBJECTS AND SUMMARY OF THE INVENTION

The invention proposes to improve the spectral efficiency in wavelength division multiplex transmission systems and to retain a spectral position of the channels that conforms to the ITU recommendation mentioned above.

To be more precise, the invention proposes a wavelength division multiplex transmission system which has at least one channel for which the spectral interval between adjacent channels on one side is different from the spectral interval between adjacent channels on the other side and which includes a demultiplexing filter attenuating more strongly on the side of the channel in which the spectral interval between adjacent channels is smaller.

For a channel having different spectral intervals between adjacent channels, the higher spectral interval is preferably at least 20% greater than the lower spectral interval.

In a preferred embodiment, the wavelengths of the channels are chosen from a set of wavelengths and the difference between two wavelengths of said set is a multiple of a minimum difference between two wavelengths of said set.

The wavelengths of the channels can also be chosen by eliminating one wavelength in three from a set of regularly spaced wavelengths.

The difference of attenuation by the filter at a frequency offset by half the modulation frequency on either side of the center frequency of the channel is advantageously greater than 5 dB.

The filter can have a symmetrical transfer function with the center frequency of the filter offset relative to the center frequency of the channel. A filter which has an asymmetrical transfer function can also be chosen.

BRIEF DESCRIPTION OF THE DRAWINGS

Other features and advantages of the invention will become apparent on reading the following description of embodiments of the invention, which description is given by way of example only and with reference to the drawings, in which:

FIG. 7 is a schematic diagram of a WDM transmission system according to the present invention.

MORE DETAILED DESCRIPTION

The invention proposes using different spectral intervals between channels in a wavelength division multiplex transmission system and using an asymmetrical demultiplexing filter to filter the channels to improve spectral efficiency. For a given channel, the demultiplexing filter attenuates more strongly channels on the side on which the spectral interval between adjacent channels is lower. In this context, the term "side" refers to the spectral position of the various channels and a side is made up of all of the frequencies that are either lower than or higher than the frequency of the channel in question.

This asymmetry of the demultiplexing filter relative to the channel can be obtained by shifting the center frequency of the filter relative to the center frequency of the channel if the filter has a symmetrical transfer function or from the shape of the transfer function of the filter. Examples of filters that can be used are given below.

The difference between the attenuation on opposite sides of the channel is preferably greater than 5 dB. The difference is calculated by measuring the attenuation of the filter at frequencies on either side of the center frequency offset by half the modulation frequency.

Moreover, the largest spectral interval for a channel having different spectral intervals between adjacent channels is advantageously greater than or equal to 20% of the smallest spectral interval. In the example given below, the difference is 100% and the spectral interval between channels on one side is twice than between channels on the other side.

The invention applies independently of the frequency grid used for the various channels. In other words, in the example of ITU-T Recommendation G.692, it proposes using frequencies chosen from a set of frequencies spaced by 50 GHz. The invention applies very well to a choice of frequencies from a set of frequencies of this kind. It also applies if the frequencies are chosen independently of any such grid.

Figure 1:
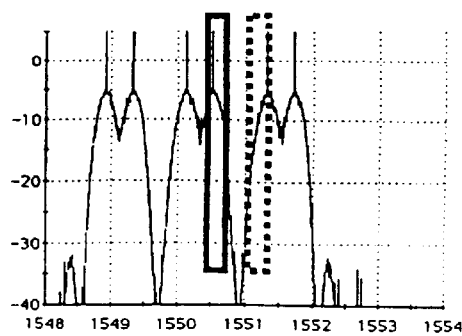
FIG. 1 shows a spectrum of the channels in one embodiment of the invention.

When the frequencies of the channels are chosen from a frequency grid—i.e. when the spectral interval between two channels is a multiple of a basic spectral interval—it is advantageous to choose only two frequencies from three in the frequency grid. In other words, in this case, as shown in FIG. 1, the spectral interval between adjacent channels on one side of the channel concerned is equal to the basic spectral interval and the spectral interval between adjacent channels on the other side is equal to twice the basic spectral interval. In the grid, one frequency in three is not used. This configuration is advantageous in that it provides a different spectral interval on each side of each channel but retains the frequency grid and maximum spectral efficiency.

For a periodic choice of frequencies of this kind, the solution of the invention goes against the proposal of ITU-T Recommendation G.692 for reducing the effects of four-wave mixing.

The invention is applied independently of the modulation format used. It is preferably applied to wide-spectrum modulation formats but can also be used in combination with narrow-spectrum modulation formats, such as the duobinary modulation mentioned above, to increase spectral efficiency further. In this kind of configuration the invention improves spectral efficiency without using elaborate filters or complex formats.

One embodiment of the invention is described next with reference to the figures. Consider a transmission system (1 in FIG. 7) with six 40 Gbit/s channels. The channels are chosen from a grid of frequencies around the wavelength of 1 550 mn and spaced by 50 GHz. As explained above, only two frequencies in three are used. In other words, if the frequencies are denoted $\lambda 1$ to $\lambda 8$, the frequencies $\lambda 1, \lambda 2, \lambda 4, \lambda 5, \lambda 7$ and $\lambda 8$ are used for multiplexing. In this configuration, the spectral interval between adjacent channels on one side is 50 GHz and the spectral interval between adjacent channels on the other side is 100 GHz. Of course, the channels at each end of the multiplex have an adjacent channel on only side; it remains true that the spectral interval on one side—which is equal to the basic spectral interval—is greater than the spectral interval on the other side—which is infinite.

In this case, the demultiplexing filter 2 proposed by the invention attenuates more strongly on one side than the other. The filter used in the example is a Gaussian filter having a half-amplitude width of 0.24 nm (30 GHz at 1550 nm). The filter is offset relative to the filter channel by 0.12 nm. In this kind of configuration the attenuation difference is 14 dB at 15 GHz on either side of the center frequency of the channel. The modulation frequency in the example is 40 GHz and the attenuation difference at 20 GHz remains greater than 14 dB on either side of the center frequency of the channel.

FIG. 1 shows the spectrum of the signal with the wavelength in nanometers plotted on the abscissa axis and the attenuation plotted on the ordinate axis; the figure shows clearly the six channels and the frequencies that are not used. Bold line is used in the figure to show the spectral position of the filter for the channel at the frequency $\lambda 5$ and dashed line is used to show the spectral position of the filter for the channel at the frequency $\lambda 7$. For the channel at the frequency $\lambda 5$, the filter attenuates more strongly on the lower wavelength side than on the higher wavelength side. In other words, the filter attenuates more strongly on the side of the channel at the frequency $\lambda 4$, for which the channel spacing is 50 GHz, than on the side of the channel at the frequency $\lambda 7$, which the channel spacing is 100 GHz. Conversely, for the channel at the frequency $\lambda 5$, the filter attenuates more strongly on the higher wavelength side than on the lower wavelength side. In other words, the filter attenuates more strongly on the side of the channel at the frequency $\lambda 8$, for which the spacing is 50 GHz, than on the side of the channel at the frequency $\lambda 5$, for which the spacing is 100 GHz.

Figure 2:
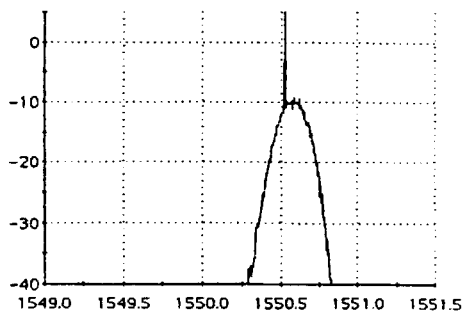
FIG. 2 shows a spectrum of a filtered channel from the FIG. 1 example.

FIG. 2 shows the filtered channel. In this example, the filtered channel is the channel at the frequency $\lambda 5$. The figure shows that after filtering there remain only the signals of the channel, plus noise at a level of −10 dB.

Figure 3:
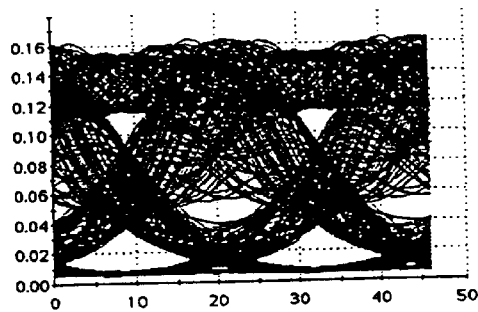
FIG. 3 shows an eye diagram for the transmission system from FIGS. 1 and 2.

FIG. 3 shows the eye diagram for the transmission system from FIGS. 1 and 2. The diagram is wide open.

Figure 4:
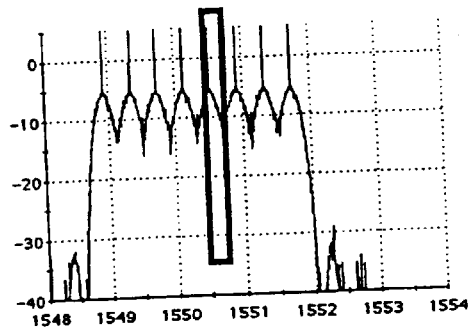
FIGS. 4 to 6 correspond to FIGS. 1 to 3 for channels with a regular spectral interval.
Figure 5:
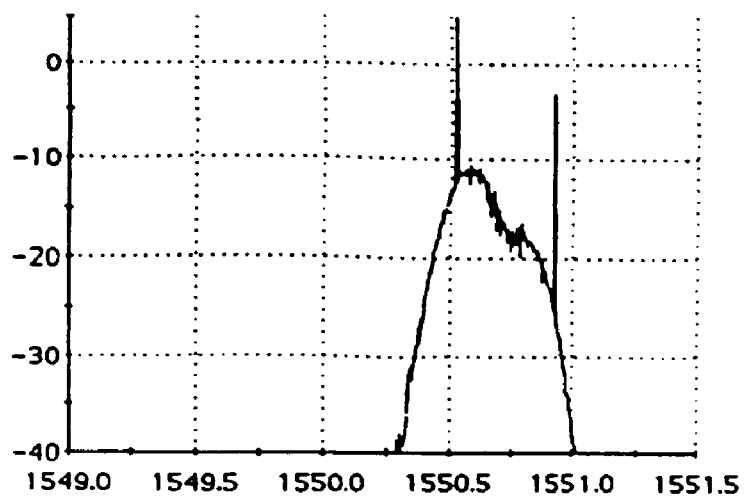
Figure 6:
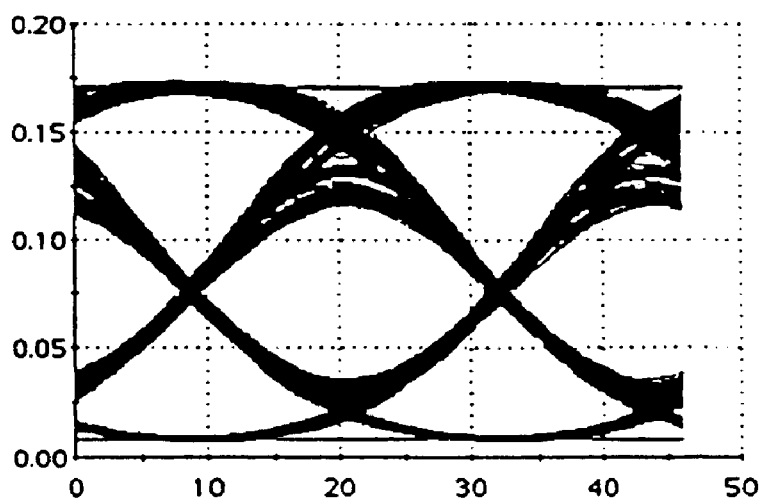

FIGS. 4 to 6 are similar to FIGS. 1 to 3, but correspond to the situation in which the channels are regularly spaced, i.e. to the situation in which all the frequencies from the grid are used. Compared to the previous example, the channels at the frequencies $\lambda 3$ and $\lambda 6$ are simply added on. FIG. 5 shows that after filtering there is a portion of the signal of the adjacent channel with an attenuation of the order of 6 dB. Similarly, FIG. 6 shows that the eye diagram is significantly more closed than the FIG. 3 diagram because of coherent crosstalk. The use in accordance with the invention of a different spectral interval between the channels in addition to asymmetrical attenuation improves transmission quality.

Compared to transmission with a spectral interval of 100 GHz between channels, with an identical signal format and an identical bit rate, the improvement in spectral efficiency due to the invention is 25% and the spectral efficiency obtained in the example given is 0.53 bit/s/Hz; the frequency grid proposed by the ITU recommendation is retained.

It will be apparent to the skilled person that the invention does not propose single sideband or vestigial sideband modulation or demodulation. There is no similarity between those modulation methods and the invention.

Of course, the invention is not limited to the preferred embodiments described by way of example and is open to many variations. Thus a frequency grid other than the grid with a step of 50 GHz can be used; the invention can be used at various places in the transmission system, and more specifically anywhere channels are demultiplexed. The invention has been described in the case where the spectral interval between adjacent channels is identical for all the channels—50 GHz on one side and 100 GHz on the other; the invention can also be used in cases where different channels have different spectral intervals.

What is claimed is:

1. A wavelength division multiplex transmission system which has at least one channel for which the spectral interval between adjacent channels on one side is different from the spectral interval between adjacent channels on the other side and which includes a demuhiplexing filter attenuating more strongly on the side of the channel in which the spectral interval between adjacent channels is smaller.

2. The system of claim 1, wherein, for a channel having different spectral intervals between adjacent channels, the higher spectral interval is at least 20% greater than the lower spectral interval.

3. The system of claim 1, wherein the wavelengths of the channels are chosen from a set of wavelengths and the difference between two wavelengths of said set is a multiple of a minimum difference between two wavelengths of said set.

4. The system of claim 1, wherein the wavelengths of the channels are chosen by eliminating one wavelength in three from a set of regularly spaced wavelengths.

5. The system of claim 1, wherein the difference of attenuation by the filter at a frequency offset by half a modulation frequency on either side of a center frequency of the channel is greater than 5 dB.

6. The system of claim 1, wherein the filter has a symmetrical transfer function and the center frequency of the filter is offset relative to the center frequency of the channel.

7. The system of claim 1, wherein the filter has an asymmetrical transfer function.

* * * * *